June 16, 1942.  M. A. HOLLENGREEN  2,286,620
STEADY REST ADJUSTING MEANS
Filed May 18, 1939   2 Sheets-Sheet 1

Inventor
MILBURN A. HOLLENGREEN
By Hugh N Rocks
Attorney

June 16, 1942.   M. A. HOLLENGREEN   2,286,620
STEADY REST ADJUSTING MEANS
Filed May 18, 1939   2 Sheets-Sheet 2
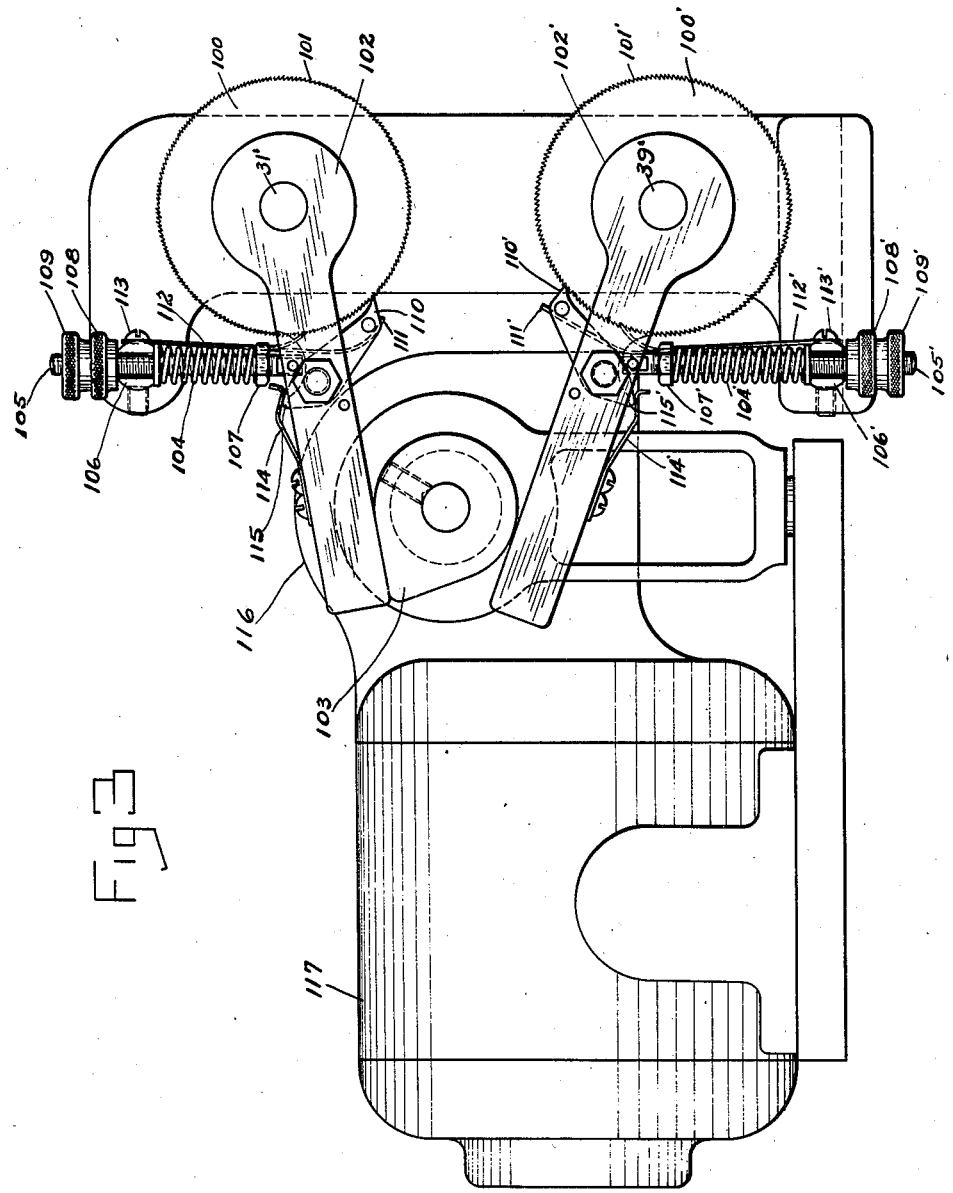
Inventor
MILBURN A. HOLLENGREEN
By
Hugh N. Rockse
Attorney Patented June 16, 1942

2,286,620

UNITED STATES PATENT OFFICE 2,286,620

STEADY REST ADJUSTING MEANS

Milburn A. Hollengreen, Waynesboro, Pa., assignor to Landis Tool Company, Waynesboro, Pa.

Application May 18, 1939, Serial No. 274,439

11 Claims. (Cl. 51—238)

My invention relates to steady rests for machine tools, particularly grinding machines.

It is an object of my invention to provide means for automatically adjusting the work engaging surfaces of a steady rest as the work is reduced in size.

It is a further object to provide power means for driving said adjusting means.

A further object is to so control said power means as to prevent distortion of the work.

A further object is to provide means for actuating said adjusting mechanism intermittently.

Referring to the drawings:

Figure 3 is another form of my invention showing motor driven cams for operating ratchet mechanisms which in turn adjust the work engaging elements of the steady rest.

Most grinding machine operators will agree that the most satisfactory method of adjusting the steady rest during a grinding operation is by means of a hand operated screw connected to the work engaging shoe. The reason for this is that the operator can feel through the screw when the work engaging shoe is in contact with the work piece, and by his sense of touch can tell just the right amount of pressure to exert on the screw. Numerous attempts have been made to duplicate this method of adjusting the back rest screw mechanically. Practically all of these methods required the use of a weight supported on an arm, which in turn was attached either directly to the steady rest shoe, to a cam which in turn was connected to the steady rest shoe, or to the adjusting screw. The disadvantage of this type of adjustment lay in the fact that it was impossible to maintain a uniform pressure on the work engaging shoe. The reason for this was that when the weight moved from its top position to bottom position, the lever arm thru which the weight acted was continually changing in length, and thus the force exerted thru the screw or cam to the steady rest shoe likewise changed. Applicant has overcome these disadvantages by using a motor to apply the necessary power to turn the steady rest screws. It is necessary that this power be sufficient to hold the steady rest screw in contact with the work, but the pressure exerted on the work should not be sufficient to distort it. The power exerted on the screw must also be sufficient to overcome the starting friction in the thread. In order to accomplish this, applicant decided to apply the power in the form of impulses. A small amount of power applied in this manner would be sufficient to overcome the starting friction in the thread, and at the same time it would not be great enough to distort the work.

Figure 1:
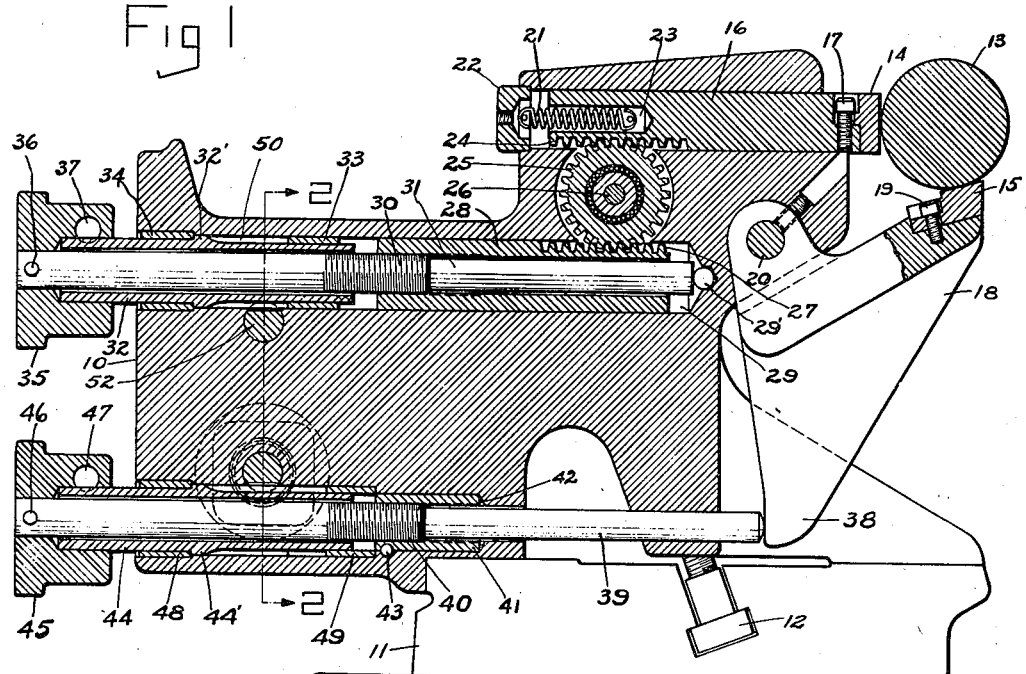
Figure 1 is an end view of my invention partly in section along line 1—1 of Figure 2.

Numeral 10, Figure 1, indicates the frame of a steady rest, clamped to the table 11 of a grinding machine by means of a clamping bolt 12 and supporting a work piece 13. The work engaging element consists of two hardened shoes 14 and 15 respectively. Shoe 14 is rigidly attached to a sliding member 16 in the frame 10 by means of a screw or screws 17. Work engaging element 15 is rigidly attached to a member 18 by means of a screw or screws 19. Member 18 is pivotally attached to the frame 10 by means of a stub shaft 20. The sliding member 16 is urged in a direction away from the work by means of a spring 21, one end of which is attached to a cap member 22, the other end of which is secured in a bore 23 in one end of member 16. Member 16 has a number of rack teeth 24 formed thereon for engaging an idler pinion 25 rotatably mounted on a shaft 26. Said pinion engages rack teeth 27 of another sliding member 28. Said member 28 is mounted in a bore 29 on frame 10. Member 28 is hollow and internally threaded for a portion of its length to receive the correspondingly threaded portion 30 of a rod 31. One end of said rod extends through member 28 to the bottom of the bore 29 where it bears against a ball 29' instead of against the bottom of the bore thus reducing the force necessary to rotate said rod. The other end of said rod extends through a sleeve 32 supported on bushings 33 and 34 in bore 29. A shoulder 32' on sleeve 32 holds said sleeve and the rod 31 against axial movement out of the bore. Said sleeve and said rod extend beyond the limit of frame 10 and a knob 35 is mounted on said extended portion. Said knob is secured to the rod 31 by means of a pin 36, and is secured to sleeve 32 by means of a pin 37. The pivoted member 18 has a tail piece 38 extended toward the lower portion of frame 10. A rod 39 protruding from the frame at their point serves to move member 18 about a stub shaft 20 in a counterclockwise direction and thereby urges the element 15 into engagement with the work piece 13. An intermediate portion 40 of said rod 39 is threaded for axial adjustment in a sleeve 41. Said sleeve is held against rotation in a bore 42 in the lower portion of frame 10 by means of a pin 43. The other end of said rod passes through a sleeve 44 and both said sleeve and said rod extend beyond the frame 10. A knob 45 is attached to said rod by means of a pin 46 and to said sleeve by means of a pin 47. Said sleeve is rotatably supported in said bore by bushings 48 and 49. A shoulder 44' bears against bushing 48 and prevents endwise movement of the rod out of the bore.

Figure 2:
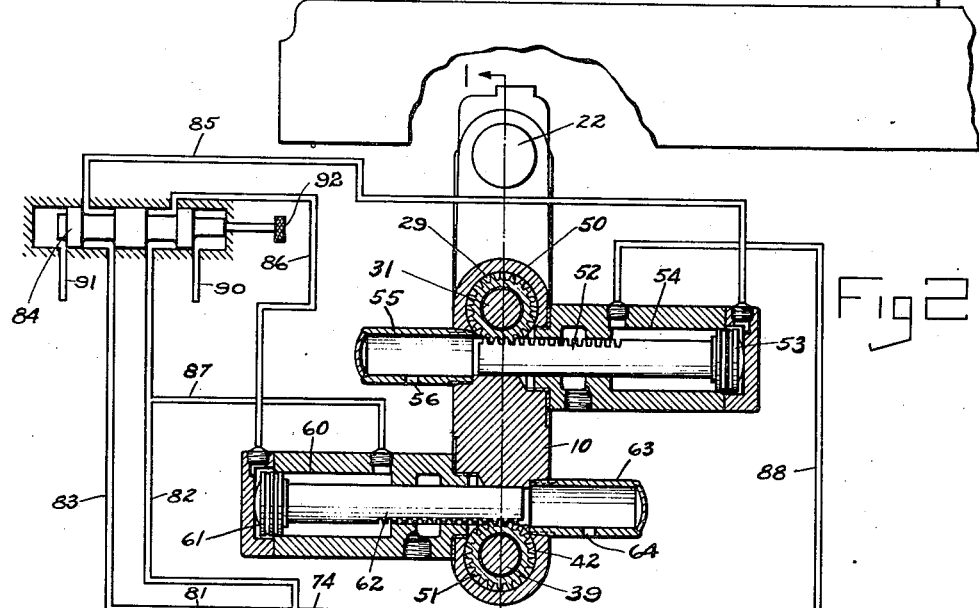
Figure 2 is a hydraulic diagram.

In Figure 2 is shown a sectional front elevation taken along the line 2—2 of Figure 1. This view is shown in conjunction with a diagram of the hydraulic system. Gear teeth 50 engage a rack 52 which is a piston rod for piston 53. This piston is slidably supported in a cylinder 54. A hood 55 on the opposite side of frame 10 from cylinder 54 receives the rack 52 as it passes beyond said frame and protects it against dirt and moisture. A drain passage 56 in said portion permits the escape of any oil which might collect therein. Associated with the rod 39 is a set of elements identical with those used in connection with the rack 27 and consisting of a cylinder 60, a piston 61, a rack 62 and a hood 63 with a drain passage 64. The arrangement of these parts with relation to gear teeth 51 is just the reverse of the arrangement of the corresponding parts mentioned above in relation to gear teeth 50.

Fluid under pressure for the operation of my device is supplied by pump 70 through a pressure line 71 from which it is distributed through two lines 72 and 73 to a valve 74. Each of the lines 72 and 73 contain a pressure reducing valve 75 and 76 respectively. A relief valve 77 which may be adjusted, determines the maximum pressure on the system. Valve 74 is actuated in one direction by double lobe cam 78 driven thru a suitable reduction gearing 79 by a motor 80. Said valve is actuated in the opposite direction by means of a spring 81. Fluid under pressure is distributed from said valve 74 through lines 82 and 83 to a reversing valve 84 and lines 85 and 86 to the head end of cylinders 54 and 60 respectively. A branch line 87 leads from line 82 to the rod end of cylinder 60. A branch line 88 leads from line 83 to the rod end of cylinder 54. Each of the valves 75 and 76 may be adjusted independently to take care of any variation in pressure requirements in the two cylinders 54 and 60. With the valve 84 in the position shown, both sides of each of the cylinders 60 and 54 are supplied with fluid under pressure simultaneously. However, the effective area of the two sides of the pistons is such that the pressure exerted on the rod end of the pistons merely acts as a damper. When valve 84 is shifted to the opposite position the lines 86 and 85 are connected to exhaust passages 90 and 91 respectively. Under these conditions the fluid entering the rod end of each of the cylinders is sufficient to cause a reverse movement of the pistons and thereby reset the work engaging elements of the steady rest.

In Figure 3 is shown a form of my invention wherein the threaded rod 31' is attached to a ratchet wheel 100 having ratchet teeth 101. In this case the threads are left hand. An arm 102 mounted to rotate freely about rod 31' is held in contact with a cam 103 by means of a spring 104. Spring 104 is mounted on a threaded member 105 which in turn is pivotally attached to arm 102, the other end of said threaded member is supported for sliding movement in a lug 106. One end of spring 104 rests against the lug 106 and the other end against a nut 107. Tension on spring 104 may be adjusted by means of a knurled nut 108 and such adjustment may be maintained by means of a knurled lock nut 109. A pawl 110 pivotally mounted on arm 102 is held in contact with ratchet teeth 101 by means of a spring 111. Spring 111, as well as a second spring 112, are attached to lug 106 by means of a screw 113. The free end of spring 112 is set to engage ratchet teeth 101 and to prevent reverse movement of the ratchet wheel 100. Another spring 114 is firmly secured to the arm 102 and engages a cam shaped appendage 115 of the pawl 110. This spring serves to hold the pawl either in or out of operative position. Cam 103 is driven through a suitable reduction unit 116 by a motor 117. Said cam also functions through an arm 102', a pawl 110' and a ratchet wheel 100', for rotating threaded rod 39' whereby to move work engaging shoe 15 into engagement with work piece 13.

*Operation*

In the operation of my device, assuming that pump 70 and motor 80 have been started, and with valve 84 in the position shown, fluid under pressure is directed to pressure line 71, valves 75 and 76 and lines 72 and 73 to the reciprocating valve 74. Because of the action of said valve in response to cam 78 and spring 81, said fluid under pressure is directed intermittently into lines 82 and 83 leading to valve 84. With valve 84 in the position shown, said fluid under pressure is directed thru the lines 85 and 86 simultaneously to the head end of the cylinders 54 and 60 respectively. Said fluid under pressure is directed from line 82 thru a branch line 87 to the rod end of cylinder 60, and from line 83 thru a branch line 88 to the rod end of cylinder 54. However, because of the difference in the area of the two sides of the pistons 53 and 61, the fluid under pressure directed to the rod end has only the effect of steadying the movement of the piston. Piston 53 moves to the left in Figure 2 and thru rack 52 rotates gear 50 and rod 31 in a clockwise direction. The threaded portion 30 of said rod acting in the threaded portion of the member 28, causes said member along with the rack teeth thereon to move to the left in Figure 1. Said rack in engagement with pinion 25 causes the movement thereof in a clockwise direction. This movement is transmitted thru the rack teeth 24 on member 16, and urges said member against the action of spring 21 to move toward the right in Figure 1. The work engaging member or shoe 14 being mounted on the sliding member 16 is urged into contact with the work 13. Piston 61 is moved to the right in Figure 2 under the impulses of the fluid under pressure toward the line 86. This movement of piston 61 is effective thru rack 62 to turn gear 51 and rod 39 in a clockwise direction. The threaded portion 40 of said rod 39 rotating in sleeve 41 causes said rod to move to the right in Figure 1 against tail portion 38 of pivoted member 18. Said pivoted member 18 rotates in a counter-clockwise direction and the work engaging shoe 15 mounted thereon is moved in a substantially vertical direction into contact with the work piece 13.

The reason for providing a pulsating supply of fluid under pressure to the cylinders 54 and 60 is that the force required to overcome the starting friction in the threaded portions 30 and 40 is more than enough to hold the work engaging shoes 14 and 15 in contact with the work. In fact it is great enough to cause a slight distortion of the work. A pulsating supply of fluid has the effect of the greater pressure so far as overcoming the starting friction of the screw is concerned, and at the same time it exerts only sufficient pressure on the work engaging shoes to hold said shoes in contact with the work. Because of the difference in mechanical structure of the mechanisms for moving the two shoes 14 and 15, a different pressure might be required for the operation of each, and for this reason the reducing valves 75 and 76 are used. These valves may be set independently for any desired pressure.

When it is desired to move the work engaging shoes 14 and 15 away from the work, the valve 84 is shifted manually to the left in Figure 2 by means of knob 92, and lines 85 and 86 are connected to exhaust lines 91 and 90 respectively. Under these conditions the fluid supplied to the rod ends of the cylinders thru lines 88 and 87 is sufficient to move piston 53 to the right and piston 61 to the left in Figure 2, thus rotating the rods 31 and 39 in a counterclockwise direction and permitting sliding member 16 and shoe 14 to be withdrawn by spring 21, while pivoted member 18 and shoe 15 drop away under the influence of gravity.

If for any reason fluid under pressure is not available, the supply fails, or it is desired to operate the rest by hand, manual operation may be accomplished by means of the knob 35 on rod 31 and knob 45 on rod 39.

In the form in which my invention is shown in Figure 3 the motor driven cam 103 rotates arm 102 in a clockwise direction to position the pawl 110 for each feed impulse. During this movement of arm 102, the ratchet 100 is prevented from moving in the same direction as the arm by the spring 112 which engages the teeth 101 and holds said ratchet wheel against rotation. During this movement of arm 102 spring 104 is compressed between nut 107 and lug 106. As soon as arm 102 is released by cam 103 the spring 104 expands and shifts said arm in a counter-clockwise direction carrying with it pawl 110 which is held in contact with the ratchet teeth 101 by means of spring 111, thus rotating the ratchet wheel and the rod 31' in a counter-clockwise direction. The effect of rotating rod 31' has been described above. A similar mechanism is applied to the rotation of rod 39'. The force exerted by spring 104 is just sufficient to hold the work engaging shoes in contact with the work, but it must be supplied in the form of an impulse in order to overcome the starting friction in the working parts.

I claim:

1. A steady rest for a grinding machine including a frame, a work engaging member movably mounted in said frame, a screw for adjusting said work engaging member toward a work piece, power means for yieldingly rotating said screw, and means including a motor and devices actuated thereby for supplying power to said screw rotating means in the form of impulses.

2. A steady rest for a grinding machine including a frame, a work engaging member movably mounted in said frame, means for adjusting said work engaging member toward or away from a work piece including a screw, power means for rotating said screw intermittently, and resilient means between said power means and said screw to limit the force exerted by said power means to an amount just sufficient to maintain contact between the work engaging element or shoe and the work piece.

3. A steady rest for a grinding machine comprising a frame, a work engaging member movably mounted in said frame, a screw for adjusting said work engaging member toward or away from a work piece, power means for rotating said screw, means for supplying power to said screw rotating means in the form of impulses including a control element, and means for actuating said control element intermittently.

4. A steady rest for a grinding machine including a frame, a work engaging member movably mounted in said frame, means for adjusting said work engaging member toward or away from a work piece including a screw, power means for rotating said screw including a pawl and ratchet mechanism, a cam for shifting said pawl in one direction, and resilient means for shifting said pawl to engage and rotate said ratchet.

5. A steady rest for a grinding machine including a plurality of work engaging members, mechanisms including screws for adjusting each of said work engaging members toward and from the work piece, separate power means for rotating each of said screws independently one of the other, and control means for actuating each of said power means intermittently.

6. A steady rest for a grinding machine including a plurality of work engaging members, mechanisms for adjusting each of said work engaging members toward and from the work piece, separate power means for actuating each of said adjusting means independently one of the other, means for actuating said power means intermittently, and independent means for varying the amount of power applied to each of said adjusting mechanisms.

7. A steady rest for a grinding machine comprising a plurality of work engaging members movable toward and from a work piece, mechanisms for adjusting each of said work engaging members toward and from the work piece, separate power means for actuating each of said adjusting means independently one of the other including a piston and cylinder, a supply of fluid under pressure for moving said piston, means for controlling said supply of fluid under pressure whereby said adjusting means will be subjected to a series of power inpulses, and means for adjusting independently the pressure of the fluid supplied to each of said cylinders.

8. A steady rest for a grinding machine comprising a plurality of work engaging members movable toward and from a work piece, mechanism for moving each of said work engaging members toward and from the work piece including adjusting screws, power means for rotating each of said adjusting screws independently one of the other including a motor, a supply of fluid under pressure for actuating said motor, and means for controlling said supply of fluid under pressure whereby said adjusting screws will be subjected to a series of power impulses.

9. A steady rest for a grinding machine comprising a work engaging member movable toward and from a work piece, mechanism for moving said work engaging member including an adjusting screw, self-contained power means for yieldingly rotating said adjusting screw as the diameter of the work changes, including a motor, and means for controling said power means whereby said adjusting screw will be subjected to a series of power impulses.

10. A steady rest for a grinding machine comprising a work engaging member movable toward and from a work piece, mechanism for moving said work engaging member including an adjusting screw, self-contained power means for rotating said adjusting screw including a motor, and cam means for controlling said power means whereby said adjusting screw will be subjected to a series of power impulses.

11. A steady rest for a metal working machine comprising a work engaging member movable toward and from a work piece, mechanism for moving said work engaging member including an adjusting device, power means for actuating said adjusting device including a motor, and means for controlling said power means whereby said adjusting device will be subjected to a series of power impulses for actuating same as the diameter of the work changes.

MILBURN A. HOLLENGREEN,